United States Patent [19]

Votteler et al.

[11] Patent Number: 4,479,030

[45] Date of Patent: Oct. 23, 1984

[54] FREE STANDING SUPPLY COLUMN, ESPECIALLY FOR OFFICES

[75] Inventors: Arno Votteler, Stuttgart, Fed. Rep. of Germany; Max Danuzzi, Weisslingen, Switzerland; Fredi Dubach, Adetswil, Switzerland; Herbert Schreiner, Frauenfeld, Switzerland

[73] Assignee: Planmöbel Eggersmann GmbH & Co. KG, Espelkamp, Fed. Rep. of Germany

[21] Appl. No.: 398,346

[22] Filed: Jul. 15, 1982

[30] Foreign Application Priority Data

Jul. 16, 1981 [DE] Fed. Rep. of Germany ....... 3128085

[51] Int. Cl.³ .............................................. H02G 3/00
[52] U.S. Cl. ................................... 174/48; 248/218.4; 362/431
[58] Field of Search .................. 174/48, 49, 38, 44, 174/86, 81, 82; 362/431; 248/157, 419, 218.4, 219.1, 219.2

[56] References Cited

U.S. PATENT DOCUMENTS

| 567,550 | 9/1896 | Petereit | 174/86 X |
| 1,793,457 | 2/1931 | Adams | 174/86 X |
| 2,675,465 | 4/1954 | Saelen | 174/48 X |
| 2,922,031 | 1/1960 | Stiffel | 362/431 |
| 4,237,530 | 12/1980 | Murray et al. | 362/431 X |

FOREIGN PATENT DOCUMENTS 573029 2/1976 Switzerland .

Primary Examiner—G. P. Tolin
Assistant Examiner—D. A. Tone
Attorney, Agent, or Firm—Becker & Becker, Inc.

[57] ABSTRACT

A free standing supply column for supplying energy and for delivering communications to and away from implements or working devices, especially in offices. The column has a base support or base plate, and radial, horizontally swingable supporting arms installed on the column for the implements or devices. The supporting arms have a horizontal section and a vertical section. Several vertical pipe sections are arranged in a circle about the column middle axis in or around the upper part of the column. On these pipe sections the vertical sections of the swingable supporting arms with supply lines are held in such a way as to be individually adjustable in height.

16 Claims, 9 Drawing Figures

Fig. 1
Fig. 2
Fig. 3
Fig. 4
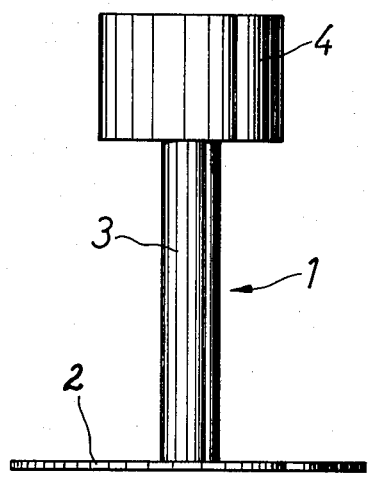
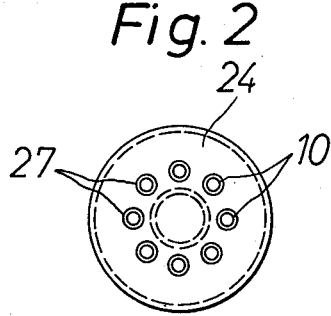
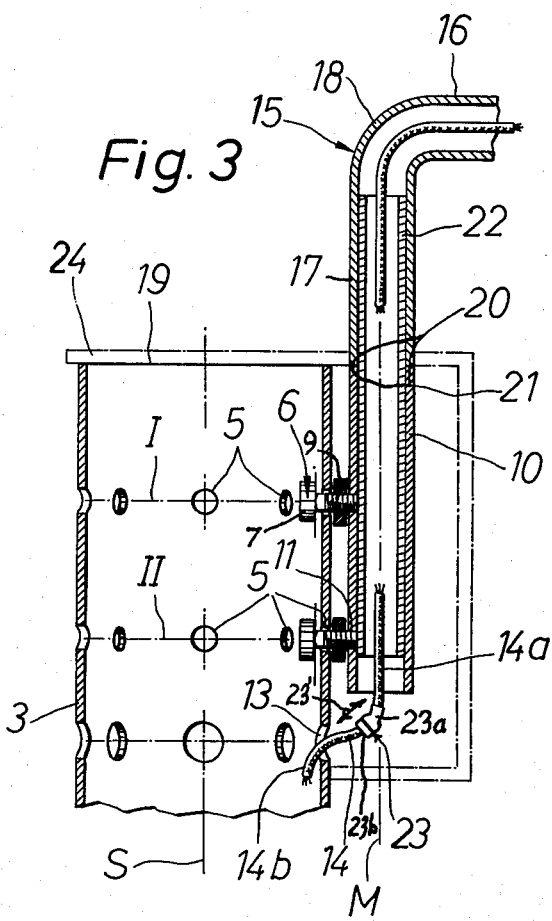
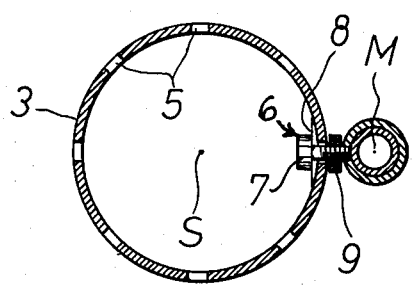

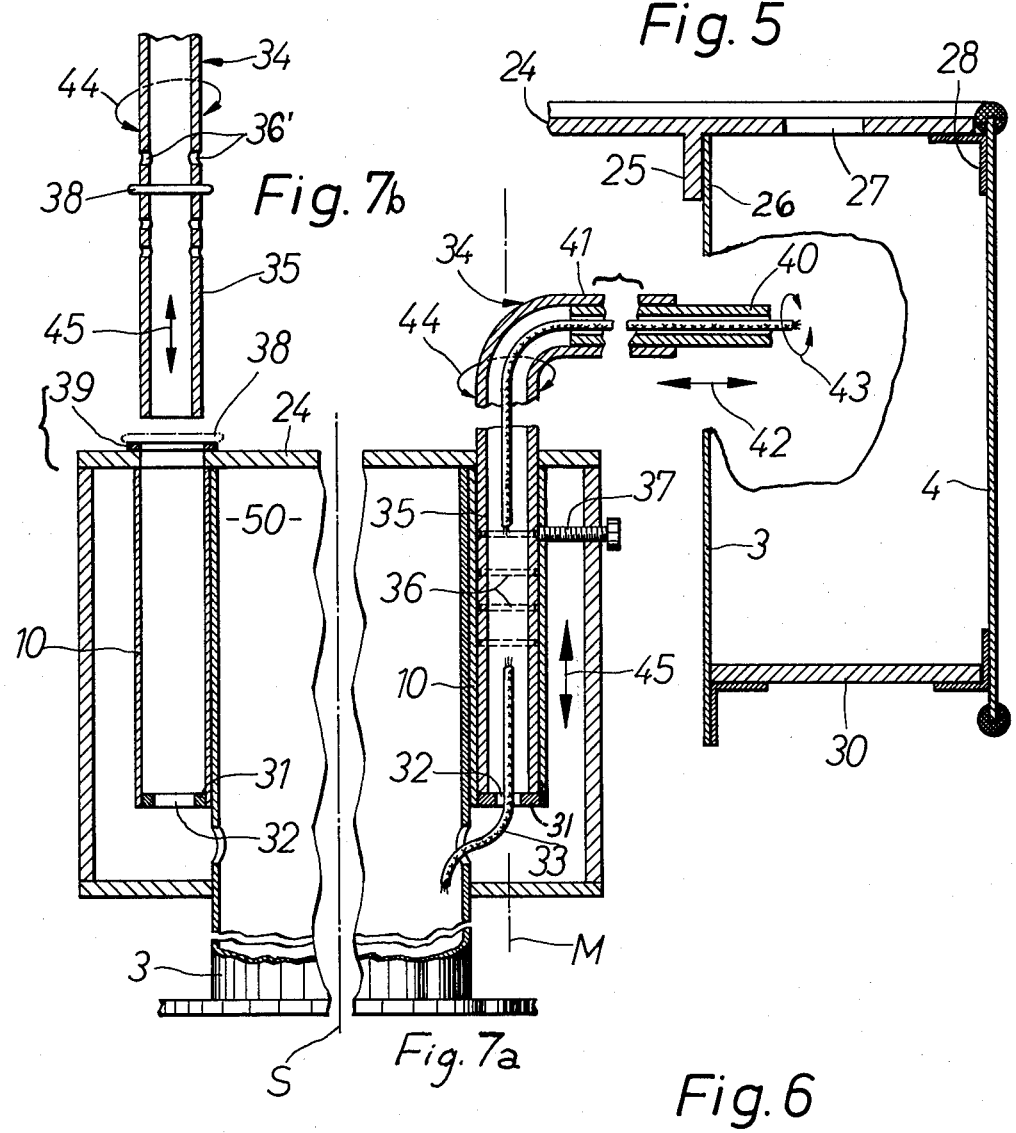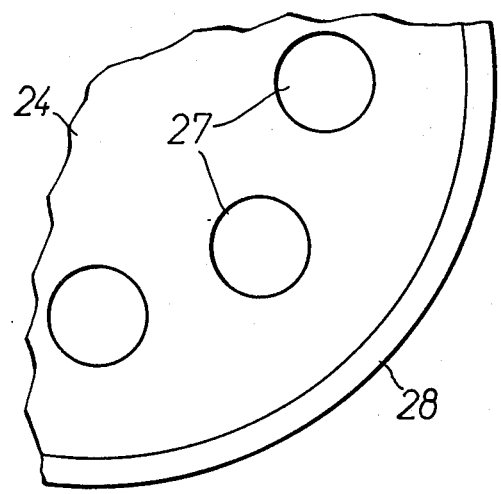

FREE STANDING SUPPLY COLUMN, ESPECIALLY FOR OFFICES

The present invention relates to a free standing supply column for supplying energy and for delivering communications to and away from working devices or implements used especially in offices; the supply column has a base support or base plate and radial, horizontally swingable supporting arms installed on the column for the devices. As large a number of supporting arms as possible is hereby to be installable on the column, which arms are all individually adjustable. Vibrations of one arm should not be transmitted to neighboring arms; and the installation and removal of the arms is to occur quickly without any tool. The devices held by the supporting arms are, for instance, telephones, lamps, and projection or picture screens.

Swingable carrier or supporting arms for telephones are known and are preferably constructed as scissor arms which are swingable about a vertical holding rod which is to be fastened on a table, and are extendable in the radial direction therefrom.

Swiss patent No. 573,029 discloses an arrangement for supplying information and energy in a building, especially in a large office, the arrangement having a foot or base plate with a free standing cylindrical column fastened thereon. On this column are arranged rings, bushings, or sleeves which are rotatable about the column and are movable up and down on this column; a carrier or supporting arm is inserted horizontally in each of these rings, sleeves, or bushings. The teaching of the present invention proceeds on the basis of this previously known apparatus and makes improvements and advances in the art going beyond such teaching or disclosure of the prior art.

It is an object of the present invention to provide the supply column with a large number of individually adjustable supporting arms, even at the same level, upon which devices are held adjacent to the column above the table top on a circle or substantially a circular line, whereby the static requirements and the requirement for freedom of the swinging movements of the individual devices located on the ends of the arms are taken into account while simultaneously providing a simple construction and possibilities for changes and adjustments without any tools.

This object, and other objects and advantages of the present invention, will appear more clearly from the following specification in connection with the accompanying drawings, in which:

FIG. 1 is a side view of a column in accordance with the present invention;

FIG. 2 is a top view of a column in accordance with the present invention;

FIG. 3 shows an embodiment of the upper section of the column taken in a cross-sectional view thereof;

FIG. 4 shows a corresponding horizontal section through the column;

FIG. 5 is a further illustration of the skirt or hood which surrounds the upper pipe sections;

FIG. 6 is a partial view from the top of the embodiment of the cover plate according to FIG. 5;

FIGS. 7a and 7b show two further embodiments for installing the supporting arms on the pipe sections.

Figure 8:
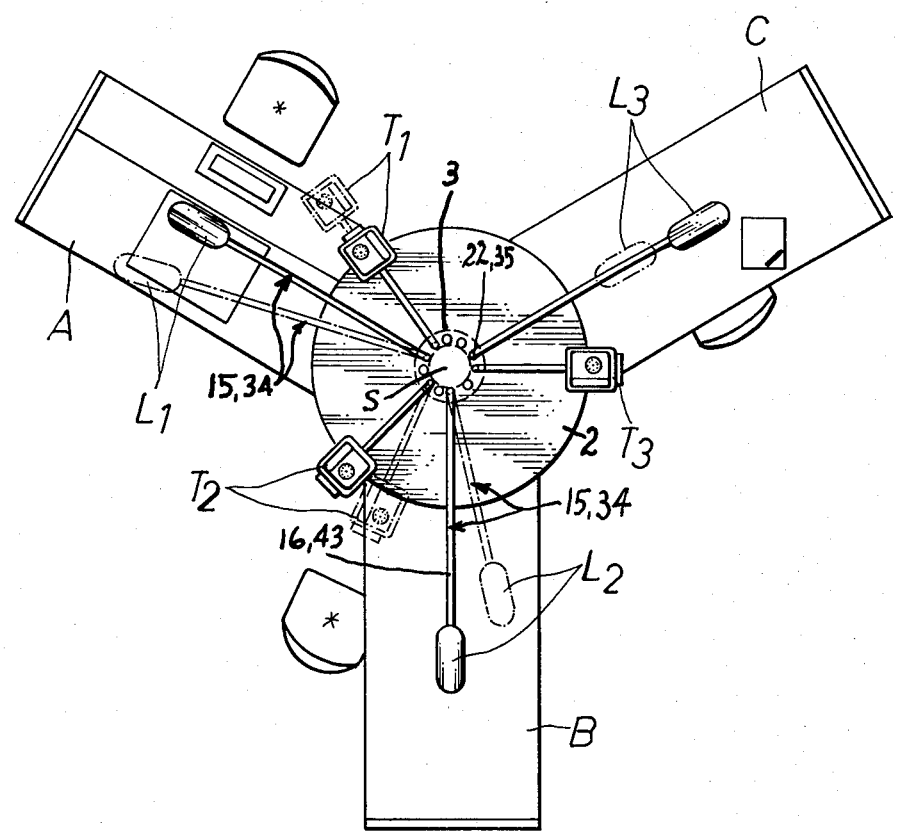
FIG. 8 is a schematic plan view of the supply column with a supporting plate at table level and three desks or tables arranged around the column with corresponding supporting arms.

The supply column according to the present invention is characterized primarily in that the supporting arms comprise a horizontal section and a vertical section, and in that in or around the upper section of the column there are arranged several vertical pipe sections; these pipes sections are arranged circularly around the central axis of the column. On these pipe sections the vertical sections of the swingable supporting arms with the supply lines are held, the supporting arms being individually adjustable as to height and being swingable.

The supporting arms which are insertable in or at the upper region of the supply column provide the possibility to swivel the free ends of these arms, located at the same level or at a different level, independently of each other into a position about the column in which the supporting arm ends occupy the most advantageous position for a user, for example above a workbench or worktable. Furthermore, the number of arms around the column can be varied in such a manner that, for example with three tables arranged in a circle around the column, three or four supporting arms can be provided for each table, accordingly nine or twelve supporting arms which can be adjusted independently of each other and upon which for instance telephones, screens, and other office equipment can be placed. The supporting arms can be swung or swivelled into a position for non-use where they are out of the way, or they can be easily removed.

The capability to change the height as well as the radial position of the individual supporting arms independently of each other is important, so that the free ends of the supporting arms can occupy every position in the room within certain limits. Since, according to an especially advantageous embodiment, the free end of the supporting arm is additionally rotatable about its longitudinal axis, this free end carrying a lamp or a screen can additionally occupy also an adjustable inclined position with respect to the horizontal. Furthermore, there exists as an advantage that the number of the supporting arms to be used can easily be changed thereby that more or less vertical sections of the supporting arms are inserted into or taken out of the vertical sleeves or bushings on the column.

According to further improvements and developments of the present invention, the pipe sections, arranged in a circle, may be welded or screwed to the outside of the column; the column is, below the pipe sections at a height of these pipe sections, provided with openings or bores for the passage of the supply lines.

The pipe sections arranged on the outside of the column may be surrounded by a cylndrical skirt or hood located coaxially of the column; the lower end of the skirt or hood extends as far as to below the openings for the supply lines.

The pipe sections may be connected with each other in a ring or cage-like manner, and the ring or cage of pipe sections with the fins interconnecting the same can be slid into or over the column. The ring or cage of pipe sections with the hood may be held as to its height by a flange directed outwardly or inwardly and located upon the upper end face of the column. The inner or outer diameter of the ring of pipe sections and fins may be such that the pipe sections are guided or supported with minimal play on the column.

The lower end of the pipe sections may be closed by an annular disc through which the supply line enters axially into the pipe section and the supporting arm.

The column, extending as far as to the height of the table may have an end plate with holes located in a circle at the height of the pipe sections through which the arms or an inner sleeve thereof can be inserted into the pipe sections. The end plate may be capable of being centered with respect to the column and may be capable of being aligned with respect to the pipe sections.

The supporting arms may be angled-off or bent away above the level of the table, and the supply line of the supporting arms may be releasably connected with the supply line in the column below the pipe section.

The supporting arms may have a flange lying upon the upper edge of the pipe sections or upon the end plate.

The vertical sections of the supporting arms may be adjustable as to height and can be fixed in their position in the pipe sections.

The pipe sections may be provided with spaced apart bores located across from each other diametrically or in the direction of a chord at the pipe cross section for passing pins or bolts therethrough determining the height of the supporting arms.

The horizontal or substantially horizontal section of the supporting arm may be telescopically extendable.

Referring now to the drawings in detail, the supply column 1 according to the present invention has a preferably round platelike foot or base 2 upon which a hollow column 3 is centrally and vertically arranged. The upper part of the hollow column 3 is surrounded by a cylindrical skirt or hood 4 spaced therefrom so that the overall configuration of the supply column as illustrated in FIG. 1 results.

The upper part of the hollow column 3 is provided with circular bores 5 located in pairs above each other in two horizontal planes I, II; screws or similar fastening means 6 are inserted through the bores 5; the heads 7 of the screws 6 are held in their position by plates or discs 8 which are supported against the inside of the hollow column 3 (FIG. 4).

The screw shafts 9 of two screws 6 respectively arranged above each other project through the corresponding bores 5 and are screwed into a pipe section 10 which is provided with corresponding threaded bores 11. The arrangement of these bores is such that respectively two bores 5 arranged one above the other are in coaxial alignment with the threaded bores 11. Every other type of releasable or fixed connection of the pipe section 10 with the column 3 is also possible.

Further radial bores 13 are provided below the end 12 of each pipe section 10 arranged concentrically with respect to the central axis S of the column; and these bores 13 are in turn arranged circularly and at the vertical height of the holes 5; the bores 13 have a larger diameter than the bores 5, and preferably are smooth-walled or the edge thereof is even slightly rounded-off. A supply line 14 for a supporting arm 15 is passed through each of these holes 13; the end of the supporting arm, not illustrated in FIGS. 3 and 7, is provided with a carrier platform for office equipment in the form of a light socket for a lamp, a supporting platform for a picture screen, or a stand for a telephone. According to the embodiments of FIGS. 3 and 7a, 7b, the supporting arm has a rectangular configuration, whereby the straight horizontal section 16 merges into the straight vertical section 17 via the curved part 18. With the embodiment according to FIG. 3, the pipe section 10 and the supporting arm 15 have the same outer and inner diameter. Since the pipe section 10 ends at the front or upper edge 19 of the column 3, the vertical section 17 of arm 15 can extend as far as to the level of this upper edge 19, where its front edge 20 engages against or rests on the front edge 21 of the pipe section 10; but it is also possible to insert suitably long spacer sleeves or bushings between the two front edges 20, 21 so that the section 16 can be brought to practically any desired height.

An inner sleeve 22 is fastened in the vertical section 17 of the arm 15; this sleeve 22 is insertable into the pipe section 10 in such a manner that hereby the arm 15 is held in its position and can be swung about the central axis M of the supporting sleeve. The height of section 16 can also be adjusted with the aid of a sleeve 22 fastened to the section 17 in such a manner that a bolt projects through the pipe section 10, which bolt passes through bores provided at different heights of the pipe section 10, and on which the sleeve 22 is seated.

A ring of pipe sections 10 is fastened around the column 3 by means of connecting means inserted through the bores 5; the sleeves 22 of the supporting arms 15 can be selectively inserted into these pipe sections 10, as recognizable in FIG. 8. The position of the individual supporting arms around the column can be varied as required by the particular kind of work performed by the user of the individual tables A, B and C (see FIG. 8).

Preferably, the line 14 is subdivided into a section 14a in the inner sleeve 22, and a section 14b in the column 3, with a suitable releasable connection 23 having mating parts 23a, 23b being provided with movement thereof represented according to arrow 23' between these two sections 14a and 14b in such a manner that, after separation of mating parts 23a, 23b of this connection 23, the supporting arm 15 can be withdrawn upwardly from the corresponding pipe section 10 when it is not needed.

The top side of the column 3 and the ring of pipe sections 10 are covered by a table-like plate 24 which engages against the upper edge region 26 of the column 3 with a downwardly projecting flange 25 and is thus centered with respect to the column 3. This plate 24 has round holes 27 arranged around the column 3 in the same way as those of the pipe sections 10, so that the lower edges of the sections 17 of the supporting arms 15 can project through the corresponding holes 27 of the plate 24, and the front faces 20, 21 respectively of the supporting arm 15 and of the pipe section 10 can rest upon each other. The front face 21 of the pipe section 10 can also terminate flush with the top side of the plate 24. The hood 4 is fastened to the plate 24 by means of an angle piece or elbow 28. The space surrounded by the outer part of the plate 24 with the hood 4 laterally adjoining and partly below the ring of pipe sections 10 is closed downwardly by a disc 30 (FIG. 5).

According to FIG. 7a, the ring of pipe sections 10 is again connected with the column 3. In this embodiment, the pipe sections 10 are provided at their lower ends with a ring disc 31 through the bores 32 of which a supply line 33 is passed. The supporting arm 34 with its vertical section 35 has an outer diameter that corresponds to the inner diameter of the pipe section 10 in such a manner that the section 35 of the supporting arm 34 is held in the pipe section 10 and can be swivelled therein about the axis M thereof. Section 35 of the supporting arm 34 is provided with annular grooves 36 located one above the other. By inserting the head or stem of a screw 37 into one of the annular grooves 36, the supporting arm can be adjusted as to height and can be held in the selected height position though still being swingable about the axis M.

With the embodiment according to FIG. 7b, the vertical section 35 has bores 36' located one above the other; these bores 36' preferably extend in pairs in the direction of a chord on the diameter of the section 35, and a pin or bolt 38 is insertable through the bores 36' in such a manner that the free ends thereof engage or rest on a ring disc 39 on the plate 24.

The horizontal sections of the supporting arms 34 are also subdivided in order to be able to change the radial position of the ends of the supporting arms 34 and thereby to change the position of the carrier platforms or stands, for instance for telephones, lamps, or picture screens; for this purpose, an inner part 40 in the section 41 of the supporting arm can be extended in the direction of the arrow 42. The part 40 can also be rotated in the section 41 in the direction of the circular arrow 43, so that also the inclination of the platform at the end of the section 40 can be changed.

The arrows 44 and 45 in FIGS. 7a and 7b represent further possibilities of movement of the platform at the end of the supporting arm. The present invention results in the capability of rotating the arm 34 about the central axis M of the pipe section 10 in addition to the capability of a height adjustment; furthermore, there is provided a radial adjustment and turning of the telescopic section 40 of the supporting arm 34 corresponding to the arrows 42, 43. In this way, every position of one platform, independently of the other platforms, is attainable above the worktable A, B or C, as it is represented by the telephones $T_1$, $T_2$, $T_3$ and lamps $L_1$, $L_2$ and $L_3$ in FIG. 8.

In an embodiment differing from that described in the foregoing paragraphs, the pipe sections 10 can also be arranged as a cage or ring in the interior of a larger column. Such a cage or ring, as are the external pipe sections 10, can be made as a closed structural unit releasable from the column 3, whereby the spaces between the pipe sections 10, as known in other technical fields, are connected with each other by fins.

The advantage of the embodiments illustrated in FIGS. 7a and 7b, having a smooth inner column wall, furthermore exists therein that the upper part 50 of the column can serve to receive a base or foot of a second column part projecting upwardly above the pipe section 10 to carry for example at a height of approximately two meters an upwardly directed room light or other device.

The end plate 24 can, essentially for reasons of saving space and transportation costs, be divided two, three or four times in the direction of its diameter, whereby the plate sections are connected with each other at the underside thereof (see FIGS. 3–5).

Rather than guiding energy and communication lines within the column 3, these lines can below the pipe sections 10 also be guided along the outside of the column 3. This applies also to the guiding of these lines on the supporting arms 15, 34. Also there the lines can be held by means of clamping straps.

The pipe sections 10 can have a length of half a meter or more, whereby the supporting arms at their ends can support devices of great weight. Vibrations at the supporting arms, for instance due to actuation of the devices on the ends of the arms, are damped or absorbed at the curved parts 18 between the sections 16, 17 of the supporting arms, so that when lifting or replacing for instance the receiver of a telephone located on a supporting arm end, the picture screen or the lamp at the end of another supporting arm does not begin to vibrate.

The present invention is, of course, in no way restricted to the specific disclosure of the specification and drawings, but also encompasses any modifications within the scope of the appended claims.

What we claim is:

1. A free standing supply column for supplying energy and delivering communications via supply lines to and away from work devices, said supply column comprising:
   a base;
   a column vertically arranged on said base and having a central axis;
   a plurality of vertical pipe sections associated with the upper portion of said column and adapted to accommodate said supply lines, each pipe section having a central axis, said central axes of said pipe sections being arranged circularly around said central axis of said column; and
   radial, horizontally pivotable supporting arms serving to support said work devices and accommodate said supply lines, each supporting arm comprising an at least nearly horizontal section, and a vertical section connected to said horizontal section and held on an associated pipe section in such a way as to be adjustable in height.

2. A supply column according to claim 1, in which said pipe sections are fastened to the outside of said column, and in which said column, below yet in the vicinity of said pipe sections, is provided with holes for the passage of said supply lines therethrough.

3. A supply column according to claim 2, which includes a cylindrical hood which is arranged coaxial to said column and surrounds said pipe sections, with the lower end of said hood extending to below said holes for said supply lines.

4. A supply column according to claim 3, which includes pipe sections which are interconnected by fins, said interconnected pipe sections forming a unit which is associated with said column.

5. A supply column according to claim 4, which includes a flange associated with the upper end face of said column for holding the height of said interconnected pipe sections with said hood.

6. A supply column according to claim 5, in which the dimensions of said pipe sections and fins are such that said pipe sections are supported by said column with minimal play.

7. A supply column according to claim 2, which includes an annular disc for closing off the lower end of said pipe sections, with said supply line axially entering into said pipe section and said supporting arm through said annular disc.

8. A supply column according to claim 2, in which said column extends to the height of a table, and is provided with an upper end plate having holes located in a circle at the height of said pipe sections.

9. A supply column according to claim 8, in which said supporting arms can be inserted through said holes in said end plate for association with said pipe sections.

10. A supply column according to claim 8, which includes a sleeve which can be inserted through said holes in said end plate and into said supporting arms and said pipe sections.

11. A supply column according to claim 8, in which said end plate can be centered with respect to said column, and can be aligned with respect to said pipe sections.

12. A supply column according to claim 8, in which said supporting arms are provided with flanges for facilitating support thereof on an associated element.

13. A supply column according to claim 2, in which said supporting arms, above the level of a table, extend at an angle to said pipe sections; and in which that portion of said supply line in said supporting arms is releasably connected below said pipe sections with that portion of said supply line in said column.

14. A supply column according to claim 2, in which said pipe sections are provided with bores which are located spaced apart above one another, and across from one another diametrically or in the direction of a chord of a cross section of said pipe sections; and which includes pins inserted through said bores for determining the height of said supporting arms.

15. A supply column according to claim 1, in which said vertical section of said supporting arms is adjustable as to height, and can be fixed in position, in said pipe sections.

16. A supply column according to claim 1, in which said at least nearly horizontal section of said supporting arm is telescopically extendable.

* * * * *

UNITED STATES PATENT AND TRADEMARK OFFICE
CERTIFICATE OF CORRECTION

PATENT NO. : 4,479,030
DATED : October 23, 1984
INVENTOR(S) : ARNO VOTTELER ET AL It is certified that error appears in the above-identified patent and that said Letters Patent is hereby corrected as shown below:

On the title-abstract page of the patent document, at [75], please correct the following:

-- [75] Inventors: Arno Votteler, Stuttgart, Fed. Rep. of Germany; Max Lanuzzi, Weisslingen, Switzerland; Fredi Dubach, Adetswil, Switzerland; Herbert Schreiner, Frauenfeld, Switzerland. --

Signed and Sealed this

Twenty-first Day of May 1985

[SEAL]

Attest:

DONALD J. QUIGG

Attesting Officer     Acting Commissioner of Patents and Trademarks